United States Patent
Izumikawa et al.

(10) Patent No.: US 11,299,094 B2
(45) Date of Patent: Apr. 12, 2022

(54) VEHICLE EXIT ASSIST APPARATUS

(71) Applicant: Toyota Jidosha Kabushiki Kaisha, Toyota (JP)

(72) Inventors: Iwao Izumikawa, Toyota (JP); Koji Takeuchi, Toyota (JP); Masaho Ishida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/192,362

(22) Filed: Mar. 4, 2021

(65) Prior Publication Data

US 2021/0284065 A1 Sep. 16, 2021

(30) Foreign Application Priority Data

Mar. 10, 2020 (JP) .............................. JP2020-040433

(51) Int. Cl.
*B60Q 1/00* (2006.01)
*B60Q 9/00* (2006.01)
*E05B 77/24* (2014.01)

(52) U.S. Cl.
CPC .............. *B60Q 9/008* (2013.01); *E05B 77/24* (2013.01)

(58) Field of Classification Search
CPC ................................ B60Q 9/008; E05B 77/24
USPC ....................................................... 340/425.5
See application file for complete search history.

(56) References Cited

U.S. PATENT DOCUMENTS

| | | | | |
|---|---|---|---|---|
| 5,790,973 A * | 8/1998 | Blaker | ................... | B60K 35/00 340/991 |
| 8,884,748 B2 * | 11/2014 | Qian | ...................... | G08B 21/22 340/438 |
| 9,954,259 B1 * | 4/2018 | Grace | ..................... | B60L 58/27 |
| 10,303,961 B1 * | 5/2019 | Stoffel | ..................... | B60Q 3/76 |
| 2005/0128064 A1 * | 6/2005 | Riesebosch | ............ | B60Q 9/001 340/457 |
| 2006/0201876 A1 * | 9/2006 | Jordan | ................. | B01D 61/145 210/609 |
| 2008/0129114 A1 * | 6/2008 | Ozaki | ................... | H02J 7/0068 307/9.1 |
| 2009/0223747 A1 * | 9/2009 | Hsu | ....................... | B66B 5/0031 187/249 |
| 2011/0151796 A1 * | 6/2011 | Walby | .................. | H04W 12/12 455/67.7 |
| 2012/0194356 A1 * | 8/2012 | Haines | .................. | B60Q 1/323 340/933 |

(Continued)

FOREIGN PATENT DOCUMENTS

JP 2018-008576 A 1/2018

*Primary Examiner* — Kerri L McNally
*Assistant Examiner* — Thang D Tran
(74) *Attorney, Agent, or Firm* — Dinsmore & Shohl LLP (57) ABSTRACT

A vehicle exit assist apparatus includes: a right BSM ECU configured to issue a warning when a moving object approaching an own vehicle is detected; and a message uttering device including an amplifier and a speaker configured to operate by electric power supplied from an in-vehicle battery, and being configured to utter a sound message in accordance with control of the right BSM ECU. The right BSM ECU is configured to supply electric power to the message uttering device when a generator configured to charge the in-vehicle battery is operating, and bring the power supply to the message uttering device to an OFF state when a predetermined condition is satisfied after the generator is stopped.

3 Claims, 3 Drawing Sheets

(56) References Cited

U.S. PATENT DOCUMENTS

| | | | |
|---|---|---|---|
| 2013/0234844 A1* | 9/2013 | Yopp | B60Q 9/008 |
| | | | 340/435 |
| 2014/0375444 A1* | 12/2014 | Madrigal Medina | B60Q 1/50 |
| | | | 340/433 |
| 2016/0215553 A1* | 7/2016 | Shibata | E05F 15/73 |
| 2016/0281399 A1* | 9/2016 | Seki | E05C 17/22 |
| 2017/0138108 A1* | 5/2017 | Kothari | E05F 15/40 |
| 2017/0144596 A1* | 5/2017 | Wu | B60Q 3/80 |
| 2017/0144597 A1* | 5/2017 | Wu | B60Q 9/008 |
| 2018/0072269 A1* | 3/2018 | Tong | B60R 25/305 |
| 2018/0229574 A1* | 8/2018 | Okimura | B60G 17/0528 |
| 2018/0370431 A1* | 12/2018 | Wincek | G01V 3/088 |
| 2019/0294161 A1* | 9/2019 | Matsumoto | B60Q 9/00 |
| 2020/0108776 A1* | 4/2020 | Fowler | B60Q 3/225 |
| 2020/0124434 A1* | 4/2020 | Marzorati | G06N 3/08 |
| 2020/0149503 A1* | 5/2020 | Doki | F02N 11/0822 |
| 2020/0262326 A1* | 8/2020 | Honda | B60N 2/3065 |
| 2020/0392768 A1* | 12/2020 | Konchan | E05B 81/76 |
| 2020/0410406 A1* | 12/2020 | Leary | G01C 21/20 |
| 2021/0009064 A1* | 1/2021 | Kim | B60Q 3/70 |
| 2021/0180373 A1* | 6/2021 | Goriesky | B60Q 1/525 |

\* cited by examiner

FIG.3

VEHICLE EXIT ASSIST APPARATUS

CROSS-REFERENCE TO RELATED APPLICATIONS

This application claims priority to Japanese patent application No. JP 2020-040433 filed on Mar. 10, 2020, the content of which is hereby incorporated by reference in its entirety.

BACKGROUND

1. Technical Field

The present disclosure relates to a vehicle exit assist apparatus.

2. Description of the Related Art

In Japanese Patent Application Laid-open No. 2018-8576, there is disclosed a vehicle exit assist apparatus (in Japanese Patent Application Laid-open No. 2018-8576, referred to as "vehicle door opening and closing assist system"), which is configured to set a determination line for determining, when an occupant opens a door to exit a vehicle, a safe opening region of the door while the vehicle is stopped, and to generate a warning when an opening region of the door overlaps the opening determination line under a state in which an approaching object approaching from a rear side of the own vehicle exists. As described above, there is known a vehicle exit assist apparatus configured to generate a warning when the vehicle exit assist apparatus detects an intention of the exit of the occupant of the own vehicle under the state in which the moving object approaching the own vehicle is detected while the own vehicle is stopped.

The occupant may exit the vehicle after an ignition switch is turned off. When the ignition switch is turned off, a generator stops. Therefore, in this case, the vehicle exit assist apparatus operates by electric power charged in an in-vehicle battery, but the generator is stopped, and the in-vehicle battery is thus not being charged. Thus, when the vehicle exit assist apparatus operates under the state in which the generator is not operating, the electric power of the battery is consumed, and there is a fear in that degradation of the battery may be accelerated. However, with the configuration in which vehicle exit assist control is not executed in order to suppress the degradation of the battery while the operation of the generator is stopped, it is not possible to notify the occupant of approach of a moving object when the occupant exits the vehicle after the generator is stopped.

SUMMARY

The present disclosure has been made in view of the above-mentioned problem, and has an object to provide a vehicle exit assist apparatus capable of reducing an electric power consumption while executing vehicle exit assist control even after a generator is stopped.

In order to solve the above-mentioned problem, according to at least one embodiment of the present disclosure, there is provided a vehicle exit assist apparatus including: a warning device configured to generate a warning directed to an occupant of an own vehicle through use of at least one of sound or light in a power-on state in which electric power from a battery configured to be charged through electric power generated by a generator in operation is used; a message uttering device configured to utter a sound message, which is different from the warning, in the power-on state in which the electric power from the battery is used; and a control device configured to determine whether there exists an alert-target moving object, which approaches the own vehicle during a period in which the own vehicle is stopped, and is a target of alert when the occupant exits the own vehicle, in the power-on state in which the electric power from the battery is used, cause the warning device to generate the warning when the control device determines that the alert-target moving object exists, and to cause the message uttering device to utter the sound message when the control device determines that a predetermined message generation condition is satisfied. In the vehicle exit assist apparatus, when the generator is stopped in the power-on state, and a predetermined specific condition for inhibiting the message uttering device from uttering the sound message is satisfied, the control device changes a state of the message uttering device from the power-on state to a power-off state in which electric power from the battery is inhibited from being used, under a state in which the control device is maintained in the power-on state.

When at least one embodiment of the present disclosure is configured as described above, the power supply for the message uttering device is not immediately turned off when the generator is stopped, but the power supply is turned off when the "predetermined condition for inhibiting the message uttering device from uttering the sound message" is satisfied. Therefore, when the message uttering device may utter the sound message, the power supply for the message uttering device is maintained on, to thereby allow the message uttering device to utter the sound message. Meanwhile, when the possibility that the message uttering device utters the sound message is low, the power supply for the message uttering device is turned off, and the electric power consumption can thus be reduced. Moreover, the power supply for the control device is maintained on even after the generator is stopped, and the execution of the vehicle exit assist control is thus continued.

The control device may be configured to determine that the predetermined specific condition is satisfied when at least one condition of a first condition, a second condition, and a third condition is satisfied, the first condition being satisfied when a boarding door provided for the own vehicle is continuously in an open state for a first period, the second condition being satisfied when a luggage door provided for the own vehicle is in an open state, the third condition being satisfied when an operation for switching door lock devices provided for the own vehicle to a locked state is performed from an outside of the own vehicle.

Further, the control device may be configured to determine that the predetermined specific condition is satisfied also when a fourth condition is satisfied, the fourth condition being satisfied when a duration in which the generator is stopped has become equal to or longer than a second period.

The "predetermined condition for inhibiting the message uttering device from uttering the sound message" may include a condition that the second period has elapsed since the generator was stopped.

The control device may be configured to: restrict opening of a vehicle door of the own vehicle when the control device determines that the alert-target moving object exists during the period in which the own vehicle is stopped; and determine, when the control device detects an operation for opening the vehicle door under a state in which the opening of the vehicle door is restricted, that the message generation condition is satisfied, and cause the message uttering device to utter a sound message indicating that the opening of the vehicle door is restricted.

When at least one embodiment of the present disclosure is configured as described above, the occupant can know a "reason for the state in which the door cannot be opened even when the door opening operation is performed." Therefore, it is possible to eliminate a sense of discomfort felt by the occupant for the behavior of the door lock devices.

DESCRIPTION OF THE EMBODIMENTS

Figure 1:
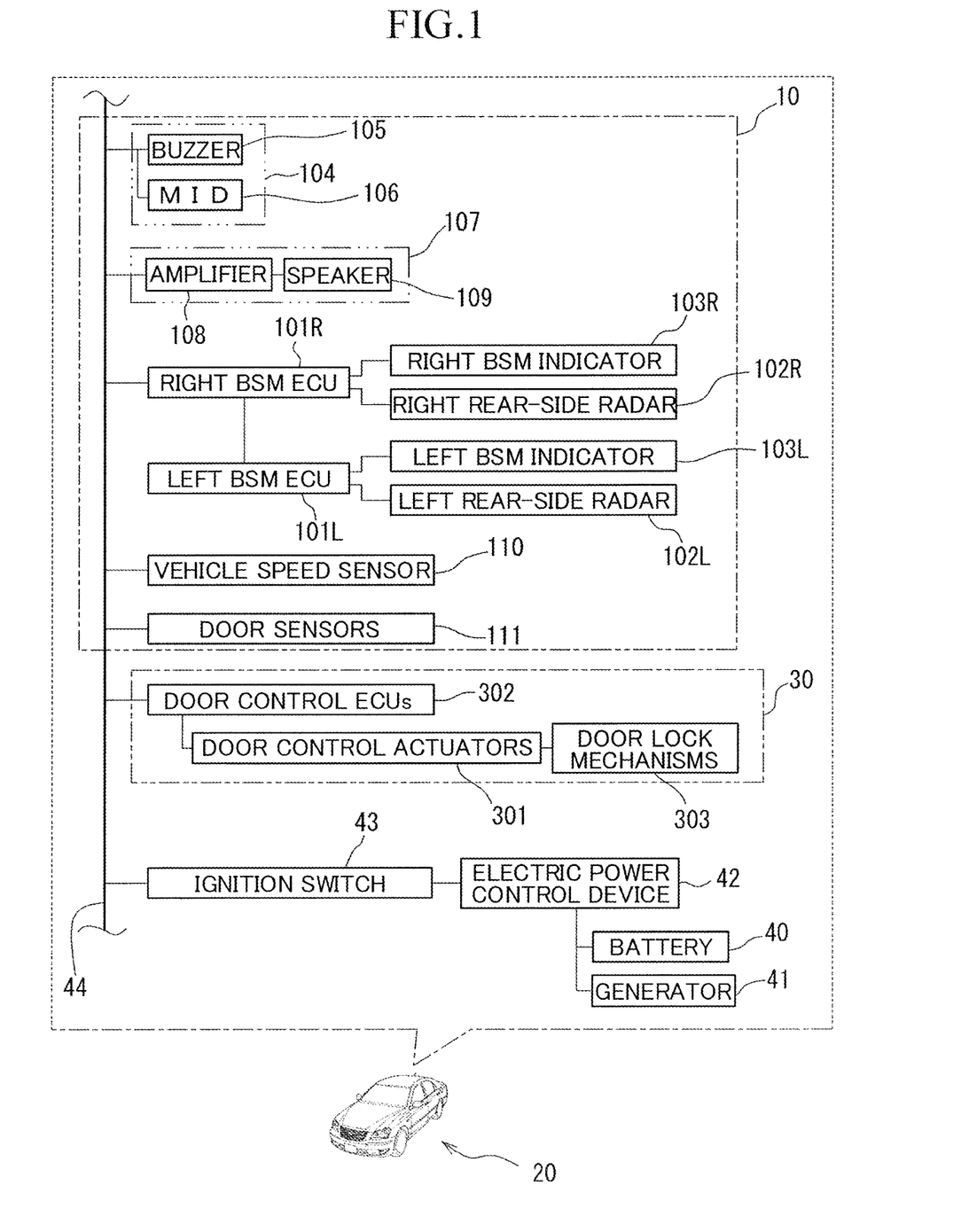
FIG. 1 is a block diagram for illustrating a configuration example of a vehicle exit assist apparatus.

As illustrated in FIG. 1, a vehicle exit assist apparatus 10 according to at least one embodiment of the present disclosure is mounted to a vehicle 20. The vehicle exit assist apparatus 10 is configured to be able to execute vehicle exit assist control of assisting a safe exit of an occupant while the vehicle 20 is stopped. In the following description, the vehicle exit assist apparatus 10 is sometimes referred to as "apparatus 10 of this embodiment," and the vehicle 20 is sometimes referred to as "own vehicle 20."

Figure 2:
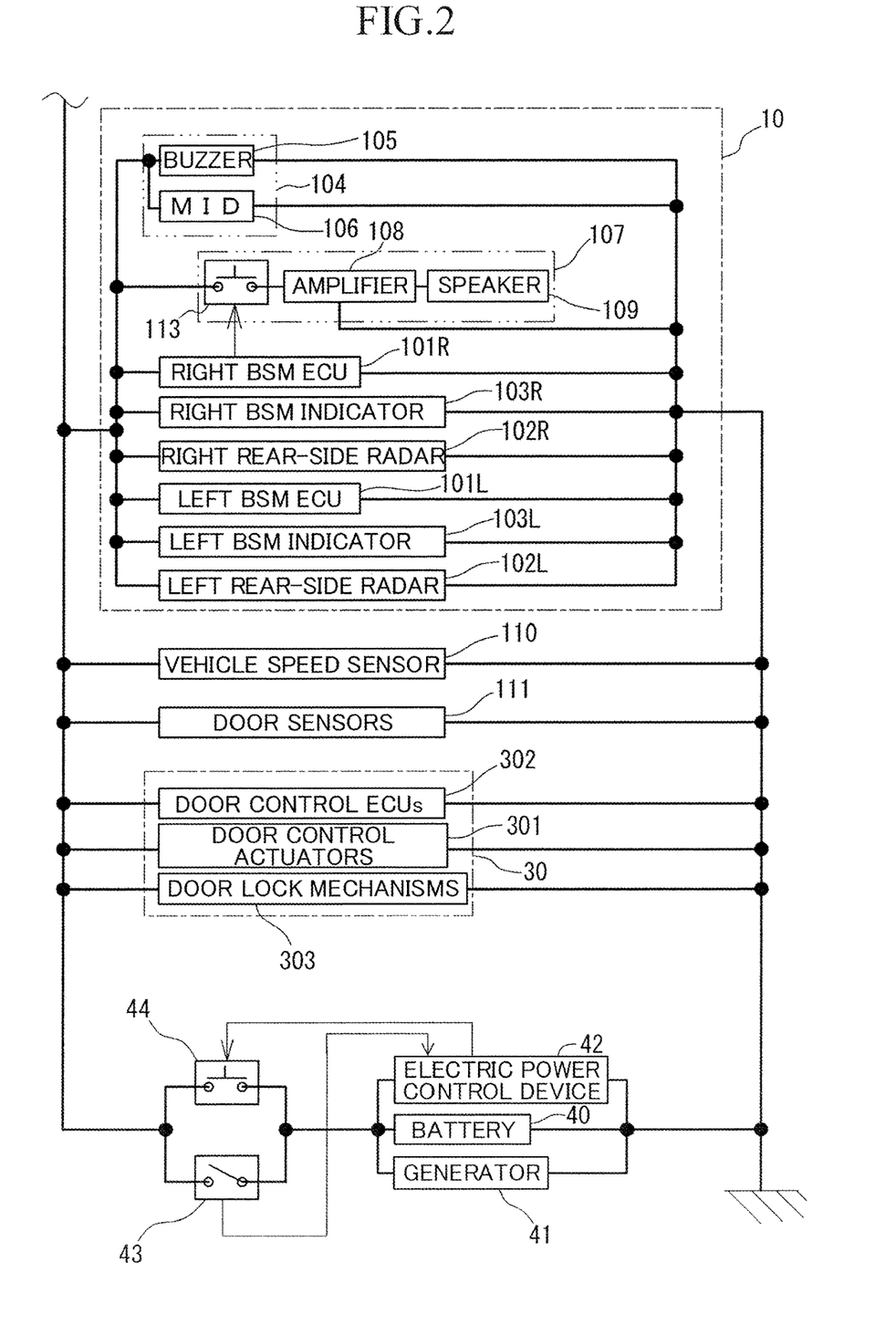
FIG. 2 is a diagram for illustrating an example of a circuit for electric power supply of the vehicle exit assist apparatus.

The own vehicle 20 includes the apparatus 10 of this embodiment, door lock devices 30, an in-vehicle battery 40 (hereinafter simply referred to as "battery 40"), a generator 41, and an electric power control device 42. The apparatus 10 of this embodiment includes a right BSM ECU 101R, a left BSM ECU 101L, a right rear-side radar 102R, a left rear-side radar 102L, a right BSM indicator 103R, a left BSM indicator 103L, a meter 104, a message uttering device 107, a vehicle speed sensor 110, and door sensors 111. Moreover, the right BSM ECU 101R, the meter 104, the message uttering device 107, the vehicle speed sensor 110, the door sensors 111, and the door lock devices 30 (door control ECUs 302) are connected to one another so as to be able to transmit and receive signals through a CAN 44. Moreover, as illustrated in FIG. 2, the apparatus 10 of this embodiment is configured to operate by electric power supplied from the battery 40 through the electric power control device 42. A "power-on state" refers to a state in which apparatus 10 of this embodiment operates by the electric power supplied from the battery 40. Moreover, "BSM" is an abbreviation of "bling spot monitor." "ECU" is an abbreviation of "electric control unit." "CAN" is an abbreviation of "controller area network."

Each ECU (control unit or controller) is a control device including a microcomputer as a principal component. The microcomputer includes a CPU, a ROM, a RAM, a nonvolatile memory, and an interface I/F, for example. The CPU is configured to read out instructions (programs and routines) stored in the ROM, load the instructions onto the RAM, and execute the instructions, to thereby achieve various functions.

The right BSM ECU 101R is connected to the right rear-side radar 102R and the right BSM indicator 103R. The left BSM ECU 101L is connected to the left rear-side radar 102L and the left BSM indicator 103L.

Each of the right rear-side radar 102R and the left rear-side radar 102L is configured to detect and acquire target information including a relative position (relative distance and relative direction) and a relative speed of an object with respect to the radar itself and a size (width) of the object, and output a signal indicating results of the detection. The right rear-side radar 102R is fixed to a right rear corner portion of a vehicle body (for example, a member mounted on a back side of a rear bumper), and is configured to detect the target information on an object existing in a detection area on a right rear-side of the own vehicle 20. The left rear-side radar 102L is fixed to a left rear corner portion of the vehicle body, and is configured to detect the target information on an object existing in a detection area on a left rear-side of the own vehicle 20. The detection area of the right rear-side radar 102R contains a blind spot region (right side blind spot region) not reflected in a right side mirror (that is, not visible to a driver seated on a driver's seat). Similarly, the detection area of the left rear-side radar 102L contains a blind spot region (left side blind spot region) not reflected in a left side mirror. Each of the right rear-side radar 102R and the left rear-side radar 102L is configured to transmit a radio wave to the detection area, receive a reflected wave of the transmitted radio wave, and acquire the target information based on the transmitted radio wave and the reflected wave.

The right rear-side radar 102R is configured to transmit the target information to the right BSM ECU 101R at predetermined short cycles. The left rear-side radar 102L is configured to transmit the target information to the left BSM•ECU 101L at predetermined short cycles. The target information may be information directly representing the relative position and the relative speed of the target with respect to each of the right rear-side radar 102R and the left rear-side radar 102L, the size of the target, and the like or information to be used to calculate the relative position, the relative speed, the size, and the like.

The right BSM ECU 101R and the left BSM ECU 101L are connected so that signals can be transmitted and received through a local bus in a master-slave manner. For example, there is provided such a relationship that the right BSM ECU 101R is a master, and the left BSM ECU 101L is a slave. The right BSM ECU 101R serving as the master is connected to the CAN 44.

The right BSM indicator 103R and the left BSM indicator 103L are configured to alert the driver of the own vehicle 20. The right BSM indicator 103R is built into the right side mirror. The left BSM indicator 103L is built into the left side mirror. The right BSM indicator 103R is configured to light or flash in accordance with a lighting signal or a flashing signal supplied from the right BSM ECU 101R. The left BSM indicator 103L is configured to light or flash in accordance with a lighting signal or a flashing signal supplied from the left BSM ECU 101L. The right BSM indicator 103R and the left BSM indicator 103L are not always required to be provided in the side mirrors, and may be provided on, for example, a cabin side of A-pillars.

The meter 104 is an example of a warning device capable of generating a warning directed to the occupant of the own vehicle 20 through use of at least one of sound or light, and includes a buzzer 105 and a multi-information display (MID) 106. The buzzer 105 can generate sound in the power-on state. The MID 106 can display an image in the power-on state. The right BSM ECU 101R transmits a buzzer drive command to the buzzer 105, to thereby be able to cause the buzzer 105 to sound. The right BSM ECU 101R transmits an image display command to the MID 106, to thereby be able to cause the MID 106 to display a predetermined image (generate the warning). The left BSM ECU 101L transmits a buzzer drive command to the right BSM ECU 101R, to thereby be able to cause the buzzer 105 to sound (generate the warning) through the right BSM ECU 101R. Similarly, the left BSM ECU 101L transmits an image display command to the right BSM ECU 101R, to thereby be able to cause the MID 106 to display a predetermined image through the right BSM ECU 101R. The specific configurations of the buzzer 105 and the MID 106 of the meter 104 are not limited, and publicly-known various configurations may be applied.

The message uttering device 107 is configured to be able to utter an utterance message different from the warning by the meter 104, which is an example of the warning device. The message uttering device 107 includes a speaker 109 and an amplifier 108. The amplifier 108 causes the speaker 109 to utter the sound message. The right BSM ECU 101R transmits an utterance command to the message uttering device 107, to thereby be able to cause the message uttering device 107 to utter the predetermined sound message (sound announcement). The left BSM ECU 101L transmits an utterance command to the right BSM ECU 101R, to thereby be able to cause the message uttering device 107 to utter the predetermined sound message through the right BSM ECU 101R.

The vehicle speed sensor 110 is configured to detect a travel speed (hereinafter referred to as "vehicle speed") of the own vehicle 20. When the right BSM ECU 101R acquires from the vehicle speed sensor 110 a detection signal indicating that the vehicle speed is zero, the right BSM ECU 101R determines that the own vehicle 20 is stopped.

The door sensor 111 is provided for each of a plurality of doors of the own vehicle 20, and is configured to detect whether each door is in an open state or in a closed state. The "plurality of doors of the own vehicle 20" include boarding doors for persons to exit and enter and a luggage door (back door) for loading and unloading luggage. When the door sensor 111 detects that the door is in the open state, the door sensor 111 generates an open signal indicating that the door is in the open state while the door sensor 111 is detecting the open state. When the door sensor 111 detects that the door is in the closed state, the door sensor 111 generates a closed signal indicating that the door is in the closed state while the closed state is being detected. Moreover, the door sensor 111 transmits the generated signal to the right BSM ECU 101R. The right BSM ECU 101R can identify the open state or the closed state of each door based on from which one of the door sensors 111 the open signal or the closed signal is received. The door sensor 111 may be included not in the apparatus 10 of this embodiment, but in the door lock device 30. In this case, the apparatus 10 of this embodiment receives the open signal or the closed signal for each door from each door lock device 30.

The door lock device 30 includes a door control actuator 301 and the door control ECU 302. The door control actuator 301 can switch a door lock mechanism 303, which is provided for each door, from a latched state to an unlatched state, from the locked state to the unlocked state, and from the unlocked state to the locked state. The "latched state" refers to a state in which the door is not allowed to be opened (the state in which the door is maintained closed). The "unlatched state" refers to a state in which the door is allowed to be opened. The "locked state" refers to a state in which the door is maintained in the latched state (state in which the door cannot be switched to the unlatched state) even when a door handle is operated by the occupant, for example. The "unlocked state" refers to a state in which the door can be switched from the latched state to the unlatched state when the door handle is operated by the occupant, for example.

The door control ECU 302 is a control device including a microcomputer as a principal component. Moreover, the door control ECU 302 is configured to drive the door control actuators 301 in accordance with an operation on a predetermined operation member by the occupant, for example, a door opening inhibition command (described later) from the right BSM ECU 101R, and the like.

The battery 40 is a supply source of electric power for an operation of in-vehicle devices including the apparatus 10 of this embodiment. The generator 41 in operation charges the battery 40. When an ignition switch 43 is switched on (when an engine (not shown) is started), the generator 41 is driven by the engine, to thereby start electric power generation. When the ignition switch 43 is turned off (when the engine is stopped), the generator 41 stops the electric power generation. The electric power control device 42 supplies the electric power charged in the battery 40 or the electric power generated by the generator 41 to the in-vehicle devices including the apparatus 10 of this embodiment. The electric power control device 42 starts the supply of the electric power to the apparatus 10 of this embodiment when the ignition switch 43 is turned on, continues the supply of the electric power to the apparatus 10 of this embodiment by maintaining a timer switch 44 in an ON state even when the ignition switch 43 is turned off, and stops the supply of the electric power to the apparatus 10 of this embodiment by bringing the timer switch 44 to an OFF state when a predetermined period has elapsed since the ignition switch 43 was turned off. For the convenience of description, the predetermined period is referred to as "third period." The third period is a non-zero period, and is, for example, five minutes.

A brief description is now given of BSM control executed by the right BSM ECU 101R. The BSM control is control of notifying the driver of the own vehicle 20 of an existence of another vehicle traveling in parallel in the blind spot region and an existence of another vehicle approaching the own vehicle 20 from a rear-side in an adjacent lane.

The right BSM ECU 101R determines whether or not there exists another vehicle having even at least a part of a vehicle body in the right blind spot region (which refers to the region not reflected in the right side mirror (liable to be the blind spot)) based on the target information transmitted from the right rear-side radar 102R. When the right BSM ECU 101R determines that another vehicle exists in the right blind spot, the right BSM ECU 101R sets the another vehicle as an alert-target object. Similarly, the left BSM ECU 101L determines whether or not there exists another vehicle having even at least a part of a vehicle body in the left blind spot region (which refers to the region not reflected in the left side mirror (liable to be the blind spot)) based on the target information transmitted from the left rear-side radar 102L. When the left BSM ECU 101L determines that another vehicle exists in the left blind spot, the left BSM ECU 101L sets the another vehicle as an alert-target object. A position and a range of each of the right blind spot region and the left blind spot region with respect to the own vehicle 20 are set in advance.

The right BSM ECU 101R determines whether or not there exists another vehicle predicted to enter the blind spot before a set period elapses based on the target information acquired from the right rear-side radar 102R. When the right BSM ECU 101R determines that there exists another vehicle predicted to enter the blind spot before the set period elapses, the right BSM ECU 101R sets the another vehicle as the alert-target object. Similarly, the left BSM ECU 101L determines whether or not there exists another vehicle predicted to enter the blind spot before the set period elapses based on the target information acquired from the left rear-side radar 102L. When the left BSM ECU 101L determines that there exists another vehicle predicted to enter the blind spot before the set period elapses, the left BSM ECU 101L sets the another vehicle as the alert-target object.

When the right BSM ECU 101R detects another vehicle being an alert-target object, the right BSM ECU 101R transmits a lighting command to the right BSM indicator 103R, to thereby light the right BSM indicator 103R. When the left BSM ECU 101L detects another vehicle being an alert-target object, the left BSM ECU 101L transmits a lighting command to the left BSM indicator 103L, to thereby light the left BSM indicator 103L. With this configuration, it is possible to notify the driver of the own vehicle 20 of the existence and the direction of another vehicle not reflected in the side mirror. The BSM control has been summarized above.

Description is now given of details of vehicle exit assist control. The right BSM ECU 101R and the left BSM ECU 101L continuously execute processing for "acquiring the object information from the right rear-side radar 102R and the left rear-side radar 102L, respectively, and determining whether or not there exists a moving object (object) approaching the own vehicle 20 from the rear-side based on the acquired object information" at predetermined cycles while the own vehicle 20 is determined to be in the stop state based on the signal acquired from the vehicle speed sensor 110 in the power-on state.

When at least one of the right BSM ECU 101R or the left BSM ECU 101L determines that an object (alert-target moving object being a target of alert when the occupant exits the vehicle) approaching the own vehicle 20 exists, the right BSM ECU 101R activates (lights or flashes) the BSM indicator corresponding to a side (that is, any one of the right side and the left side) on which the approaching object is determined to exist. Moreover, the right BSM ECU 101R causes the MID 106 to display a predetermined mark (for example, a mark clearly indicating that the moving object is approaching from a left rear side or a right rear side), and causes the buzzer 105 to sound (that is, to generate the warning). Further, the right BSM ECU 101R causes the message uttering device 107 to utter a sound message for notifying the occupant of the approaching another vehicle, for example, "Vehicle is approaching."

Still further, when the right BSM ECU 101R determines that a moving object approaching the own vehicle 20 exists, the right BSM ECU 101R transmits to the door control ECUs 302 the command (hereinafter referred to as "door open inhibition command") for inhibiting the door lock mechanisms 303 from being switched to the unlatched state. When the door control ECUs 302 receive the door opening inhibition command from the right BSM ECU 101R, the door control ECUs 302 control the door control actuators 301, to thereby switch the door lock mechanisms 303 to the locked state. When the door lock mechanisms 303 are already in the locked state at a time point of the reception of the door opening inhibition command, the door control ECUs 302 maintain the door lock mechanisms 303 in the locked state (do not switch the state of the door lock mechanisms 303).

When the right BSM ECU 101R detects an operation of the switching of the door lock mechanisms 303 to the unlatched state by the occupant from the inside of the vehicle under a state in which the right BSM ECU 101R determines that a moving object approaching the own vehicle 20 exists, and thus switches the door lock mechanisms 303 to the locked state, the right BSM ECU 101R causes the message uttering device 107 to utter a sound message for notifying the occupant of the state in which "the door lock mechanisms 303 are switched to the locked state, and the door cannot thus be opened." For example, the right BSM ECU 101R causes the message uttering device 107 to utter a sound message: "A vehicle is approaching from the rear side, and the doors are locked." With this configuration, the occupant can know a "reason for the state in which the doors cannot be opened even when the door opening operation is performed." Thus, it is possible to eliminate a sense of discomfort felt by the occupant for the behavior of the door lock devices 30. In this case, the right BSM ECU 101R may cause the message uttering device 107 to utter the sound message, and may cause the buzzer 105 to sound.

As described above, when the right BSM ECU 101R detects a moving object approaching from the rear side while the own vehicle 20 is stopped, the right BSM ECU 101R activates the right BSM indicator 103R, the left BSM indicator 103L, the meter 104, and the message uttering device 107, and transmits the door opening inhibition command to the door control ECUs 302. As a result, the warning to the occupant and the provision of the information to (description of the state for) the occupant are executed, and the opening of the doors is restricted. Moreover, as the message generation conditions for causing the message uttering device 107 to utter the message, there are defined in advance a "case in which at least one of the right BSM ECU 101R and the left BSM ECU 101L determines that a moving object approaching the own vehicle 20 exists" and a "case in which the right BSM ECU 101R determines that a moving object approaching the own vehicle 20 exists, to thereby switch the door lock mechanisms 303 to the locked state, and, after that, detects the operation of switching the door lock mechanisms 303 to the unlatched state by the occupant from the inside of the vehicle." Moreover, when at least one of those conditions is satisfied, the right BSM ECU 101R determines that the message generation condition is satisfied.

The vehicle exit assist control has a first mode and a second mode. The first mode is a mode in which the electric power is supplied to the message uttering device 107, to thereby cause the message uttering device 107 to operate (that is, to set the message uttering device 107 to a state in which the utterance is allowed). That is, in the first mode, the message uttering device 107 is set to the power-on state (a power supply switch 113 of the message uttering device 107 is maintained in the ON state). In the first mode of the vehicle exit assist control, when at least one of the right BSM ECU 101R and the left BSM ECU 101L determines that a moving object approaching the own vehicle 20 exists, the right BSM ECU 101R activates the right BSM indicator 103R and the left BSM indicator 103L. Moreover, the right BSM ECU 101R causes the meter 104 to display the predetermined mark (for example, the mark clearly indicating that the moving object is approaching from the left rear side or the right rear side), and causes the buzzer 105 to sound. Further, the right BSM ECU 101R causes the message uttering device 107 to utter the message.

The second mode is a mode in which the electric power is not supplied to the message uttering device 107. In the second mode, the message uttering device 107 is set to the power-off state (the power supply switch 113 of the message uttering device 107 is maintained in the OFF state). However, also in the second mode, devices other than the message uttering device 107 are maintained in the power-on state, and thus execute predetermined operations. That is, in the second mode of the vehicle exit assist control, when at least one of the right BSM ECU 101R and the left BSM ECU 101L determines that a moving object approaching the own vehicle 20 exists, the right BSM ECU 101R activates a corresponding one or both of the right BSM indicator 103R and the left BSM indicator 103L, causes the meter 104 to display the predetermined mark, and causes the buzzer 105 to sound. Those operations are the same as those in the first mode. However, in the second mode, the right BSM ECU 101R does not cause the message uttering device 107 to utter the message. In other words, even when the right BSM ECU 101R transmits the utterance command to the message uttering device 107, the electric power is not supplied to the message uttering device 107, and hence the message uttering device 107 does not utter the sound message.

The message uttering device 107 includes an amplifier 108. The amplifier 108 consumes high electric power even at a timing at which the utterance is not being executed from the speaker 109. Moreover, when the generator 41 is stopped, the apparatus 10 of this embodiment operates by the electric power charged in the battery 40. Therefore, when the supply of the electric power to the message uttering device 107 is continued while the generator 41 is stopped, there is a fear in that degradation of the battery 40 may be accelerated. In the second mode, the power consumption of the apparatus 10 of this embodiment can be suppressed compared with the first mode by setting power supply for the message uttering device 107 to the OFF state. Meanwhile, when the power supply for the message uttering device 107 is set to the OFF state, the information cannot be supplied to the occupant through use of the sound message.

Thus, the right BSM ECU 101R determines that a specific condition is satisfied when a "predetermined condition for inhibiting the message uttering device 107 from uttering the message" is satisfied after the generator 41 is stopped (that is, the period in which the engine is stopped and the electric power is not generated), and switches the operation mode of the vehicle exit assist control from the first mode to the second mode. The "predetermined condition for inhibiting the message uttering device 107 from uttering the message" includes a "condition under which it can be considered that the message uttering device 107 is not required to utter the sound message" and a "condition under which it can be considered that there does not occur a state in which the message uttering device 107 is caused to utter the sound message." With this configuration, "the information can be provided for the occupant through the sound message" in accordance with necessity, and power saving of the apparatus 10 of this embodiment can be achieved.

Description is now given of the specific condition, which is the "predetermined condition for inhibiting the message uttering device 107 from uttering the message." The apparatus 10 of this embodiment uses the following four conditions (condition 1 to condition 4) for determining whether or not the specific condition is satisfied. Moreover, when at least one of the following four conditions is satisfied, the apparatus 10 of this embodiment determines that the specific condition is satisfied, to thereby switch the operation mode of the vehicle exit assist control from the first mode to the second mode.

Condition 1 (First Condition): The Opening of the Boarding Door for a Predetermined Period is Detected (First Period)

The exit from the vehicle may take a long period depending on a physical ability or a physical state of the occupant. Therefore, when the opening of the boarding door has continuously been detected for a period longer than the first period, it is considered that an occupant requiring a long period for exiting the vehicle is exiting the vehicle. In this case, it is considered that the occupant exiting the own vehicle 20, an attendant, or the like exists in an immediate vicinity of the own vehicle 20, and another vehicle is not approaching the own vehicle 20 in such a way that the another vehicle obstructs the exit of the occupant. Thus, it is considered that the situation in which the message uttering device 107 is caused to utter the sound message (that is, the situation in which a moving object approaching the own vehicle 20 exists) does not occur. Therefore, when the condition 1 is satisfied after the generator 41 is stopped, the right BSM ECU 101R switches the operation mode of the vehicle exit assist control from the first mode to the second mode. The first period is not zero, but is shorter than the third period. As described above, when the third period is five minutes, a period longer than zero and shorter than three minutes is applicable to the first period.

Condition 2 (Second Condition): The Opening of the Luggage Door is Detected

When this condition is satisfied, it is considered that unloading of luggage is to start, or luggage is being unloaded. Moreover, in this case, it is considered that a person unloading the luggage exists in an immediate vicinity of the own vehicle 20, and another vehicle is not approaching the own vehicle 20 in such a degree that the another vehicle obstructs the exit of the occupant. Therefore, it is considered that a situation in which the message uttering device 107 is caused to utter the message does not occur. Thus, when the condition 2 is satisfied after the generator 41 is stopped, the right BSM ECU 101R switches the operation mode of the vehicle exit assist control from the first mode to the second mode.

Condition 3 (Third Condition): An Operation of Switching the Door Lock Mechanisms 303 to the Locked State from the Outside of the Vehicle is Detected When this condition is satisfied, it is considered that the exit of the occupant has been completed, and the occupant does not exit the vehicle subsequently. When the occupant does not exit the vehicle subsequently, the door opening operation is not performed from the inside of the vehicle, and hence it is considered that there does not occur a situation in which the message uttering device 107 utters a message for notifying the occupant of the state in which "the door lock devices 30 are switched to the locked state, and the door cannot be opened." Moreover, after the occupant has exited the vehicle, it is considered that the sound message is not required to be uttered by the message uttering device 107.

Condition 4 (Fourth Condition): A Second Period has Elapsed Since the Generator 41 was Stopped When the predetermined period (second period) has elapsed since the generator 41 was stopped, it is considered that the occupant does not have an intention of immediately exiting the vehicle. Therefore, in this case, it is considered that the message uttering device 107 is not required to utter the sound message. Thus, when the condition 4 is satisfied, the right BSM ECU 101R switches the operation mode of the vehicle exit assist control from the first mode to the second mode. The second period is not zero, but is shorter than the third period. As described above, when the third period is five minutes, a period longer than zero and shorter than three minutes is applicable to the second period. When the second period is shorter than the first period, the condition 1 is not satisfied. Therefore, the second period is set to a period longer than the first period. When any one of the condition 1 to the condition 3 is satisfied before the condition 4 is satisfied, the right BSM ECU 101R switches the operation mode of the vehicle exit assist control from the first mode to the second mode. Therefore, the condition 4 can be considered as a condition that "the second period has elapsed since the generator 41 was stopped while none of the condition 1 to the condition 3 is satisfied."

As described above, when the third period has elapsed since the ignition switch 43 was turned off, the electric power control device 42 stops the supply of the power to the apparatus 10 of this embodiment. Therefore, in this case, the apparatus 10 of this embodiment stops the operation. Moreover, as described above, the first period and the second period are shorter than the third period, and hence, when the generator 41 is stopped, the operation mode of the vehicle exit assist control is switched from the first mode to the second mode before the supply of the electric power by the electric power control device 42 is stopped. As described above, the apparatus 10 of this embodiment switches the vehicle exit assist control from the first mode to the second mode, to thereby achieve the electric power saving when at least one of the condition 1 to the condition 4 is satisfied even before the third period has elapsed since the ignition switch 43 was turned off. The switching from the first mode to the second mode is executed by the right BSM ECU 101R of the apparatus 10 of this embodiment, and is executed independently of the stop of the electric power supply by the electric power control device 42 described above.

With this configuration, the electric power saving can be achieved while the information is reliably provided by the message uttering device 107 uttering the sound message. That is, when the generator 41 is stopped by, for example, turning off the ignition switch 43, the occupant may subsequently exit the vehicle. Thus, the right BSM ECU 101R does not switch the operation mode of the vehicle exit assist control to the second mode immediately after the generator 41 is stopped, but maintains the first mode. With this configuration, when the occupant exits the vehicle after the generator 41 is stopped, the right BSM ECU 101R can cause the message uttering device 107 to utter the sound message. Subsequently, when at least one of the condition 1 to the condition 4 is satisfied after the generator 41 was stopped, the right BSM ECU 101R switches the operation mode of the vehicle exit assist control from the first mode to the second mode. With this configuration, the electric power saving can be achieved.

Figure 3:
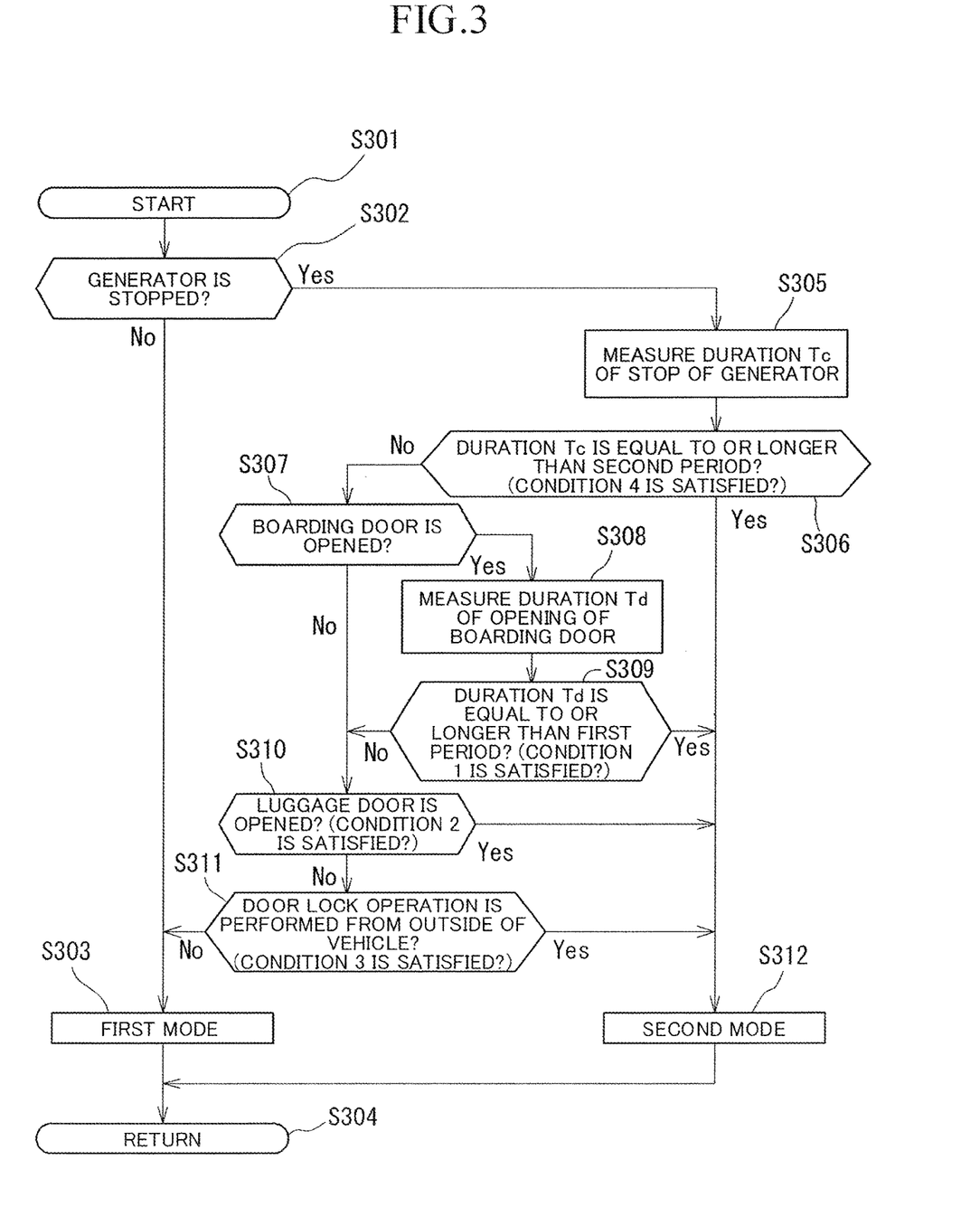
FIG. 3 is a flowchart for illustrating vehicle exit assist control.

With reference to FIG. 3, description is now given of the control of switching the operation mode of the vehicle exit assist control. The right BSM ECU 101R repeats the execution of processing of FIG. 3 at predetermined intervals while receiving the supply of the electric power by the power supply control device 42.

The right BSM ECU 101R starts this processing from Step S301, and proceeds to Step S302 to determine whether or not the generator 41 is stopped. When the generator 41 is not stopped (when the generator 41 is operating), the right BSM ECU 101R proceeds to Step S303.

When the right BSM ECU 101R proceeds to Step S303, the right BSM ECU 101R executes the vehicle exit assist control in the first mode. After that, the right BSM ECU 101R proceeds to Step S304, and temporarily finishes this processing. As described above, while the generator 41 is operating, the right BSM ECU 101R executes the vehicle exit assist control in the first mode.

When the right BSM ECU 101R determines that the generator 41 is stopped in Step S302, the right BSM ECU 101R proceeds to Step S305, and measures a duration Tc of the state in which the generator 41 is stopped (elapsed period Tc since a time point at which the generator 41 was stopped). When the measurement of the duration Tc has already been started, the measurement of the duration Tc is continued.

After that, the right BSM ECU 101R proceeds to Step S306, and determines whether or not the duration Tc is equal to or longer than the second period. That is, the right BSM ECU 101R determines whether or not the condition 4 is satisfied. When the duration Tc is shorter than the second period, the right BSM ECU 101R proceeds from Step S306 to Step S307. In Step S307, the right BSM ECU 101R determines whether or not at least one boarding door is opened based on the detection results of the door sensors 111 for the boarding doors.

In Step S308, the right BSM ECU 101R measures the elapsed period since the opening of the boarding door was detected. When the measurement of the elapsed period has already been started, the right BSM ECU 101R continues the measurement. After that, the right BSM ECU 101R proceeds to Step S309. In Step S309, the right BSM ECU 101R determines whether or not the first period has elapsed since the opening of the boarding door was detected. When the first period has not elapsed, the right BSM ECU 101R proceeds to Step S310. When the first period has elapsed, the right BSM ECU 101R proceeds to Step S312.

It is assumed that at least one boarding door is currently opened. In this case, the right BSM ECU 101R proceeds from Step S307 to Step S308, and measures a duration Td of the state in which at least one boarding door is opened (elapsed period Td since a time point at which at least one boarding door was opened). When the measurement of the duration Td has already been started, the measurement of the duration Td is continued. After that, the right BSM ECU 101R proceeds to Step S309, and determines whether or not the duration Td is equal to or longer than the first period. That is, the right BSM ECU 101R determines whether or not the condition 1 is satisfied. When the duration Td is shorter than the first period, the right BSM ECU 101R proceeds from Step S309 to Step S310.

In Step S310, the right BSM ECU 101R determines whether or not the luggage door is opened based on the detection result of the door sensor 111 for the luggage door. That is, the right BSM ECU 101R determines whether or not the condition 2 is satisfied. When the right BSM ECU 101R determines that the luggage door is not opened, the right BSM ECU 101R proceeds from Step S310 to Step S311.

In Step S311, the right BSM ECU 101R determines whether or not the operation of switching the door lock mechanisms 303 to the locked state from the outside of the vehicle is detected. That is, the right BSM ECU 101R determines whether or not the condition 3 is satisfied. When the operation of switching the door lock mechanisms 303 to the locked state is not detected, the right BSM ECU 101R proceeds to Step S303, and executes the vehicle exit assist control in the first mode as described above. That is, in this case, the generator 41 is stopped, but none of the condition 1 to the condition 4 is satisfied, and the first mode is thus selected.

When the right BSM ECU 101R proceeds to Step S312, the right BSM ECU 101R switches the operation mode of the vehicle exit assist control from the first mode to the second mode. That is, the right BSM ECU 101R turns off the power supply switch 113 of the message uttering device 107. After that, the right BSM ECU 101R proceeds to Step S304.

Meanwhile, when the duration Tc of the stop of the generator is equal to or longer than the second period, the right BSM ECU 101R proceeds from Step S306 to Step S312. When the duration Td of the state in which at least one boarding door is opened is equal to or longer than the first period, the right BSM ECU 101R proceeds from Step S309 to Step S312. When the right BSM ECU 101R determines that the luggage door is opened, the right BSM ECU 101R proceeds from Step S310 to Step S312. Moreover, when the operation of switching the door lock mechanisms 303 to the locked state from the outside of the vehicle is detected, the right BSM ECU 101R proceeds from Step S311 to Step S312.

When the right BSM ECU 101R proceeds to Step S312, the right BSM ECU 101R executes the vehicle exit assist control in the second mode. After that, the right BSM ECU 101R proceeds to Step S304, and temporarily finishes this processing. As described above, when at least one of the condition 1 to the condition 4 is satisfied while the generator 41 is stopped, the right BSM ECU 101R switches the vehicle exit assist control from the first mode to the second mode.

As described above, at a time point before the second period has elapsed since the generator 41 was stopped (that is, when the determination of "No" is made in Step S306), the right BSM ECU 101R determines whether or not at least one of the condition 1 to the condition 3 is satisfied, and when none of the conditions is satisfied (that is "No" in Step S309, Step S310, and Step S311), the right BSM ECU 101R executes the vehicle exit assist control in the first mode. Meanwhile, when at least one condition of the condition 1 to the condition 3 is satisfied at a time point before the second period has elapsed since the generator 41 was stopped (that is, the determination of "Yes" is made in Step S309, Step S310, or Step S311), the right BSM ECU 101R switches the operation mode of the vehicle exit assist control from the first mode to the second mode.

When the second period has elapsed since the generator 41 was stopped ("Yes" in Step S306), the right BSM ECU 101R switches the operation mode of the vehicle exit assist control from the first mode to the second mode. When at least one condition of the condition 1 to the condition 3 is satisfied before the second period has elapsed since the generator 41 was stopped, the operation mode of the vehicle exit assist control has been switched to the second mode. That is, the case in which the determination of "Yes" is made in Step S306 is the case in which the second period has elapsed since the generator 41 was stopped while none of the condition 1 to the condition 3 is satisfied.

As described above, the right BSM ECU 101R executes the vehicle exit assist control in the first mode while the generator 41 is operating. When at least one of the condition 1 to the condition 3 is satisfied while the generator 41 is stopped, the right BSM ECU 101R switches the operation mode of the vehicle exit assist control from the first mode to the second mode. When none of the conditions is satisfied, the right BSM ECU 101R maintains the first mode. When the second period has elapsed since the generator 41 was stopped while none of the condition 1 to the condition 3 is satisfied (that is, when the condition 4 is satisfied after the generator 41 was stopped), the right BSM ECU 101R switches the operation mode of the vehicle exit assist control from the first mode to the second mode.

In the above, the vehicle exit assist apparatus according to at least one embodiment has been described, but the present disclosure is not limited to the above-mentioned at least one embodiment, and various changes are possible within the range not departing from the object of the present disclosure.

For example, the determination of the satisfaction of the specific condition, which is the "predetermined condition for inhibiting the message uttering device 107 from uttering the message," is not limited to the configuration of using the condition 1 to the condition 4. The conditions to be used to determine the specific condition, which is the "predetermined condition for inhibiting the message uttering device 107 from uttering the message," may be a condition formed of a combination of one or more of the condition 1 to the condition 4. Moreover, conditions different from the condition 1 to the condition 4 may be used.

Moreover, in the at least one embodiment described above, description has been given of the configuration in which the right BSM ECU 101R switches the operation mode of the vehicle exit assist control from the first mode to the second mode, and then stops the supply of the electric power to the message uttering device 107, but the configuration is not limited to this configuration. The "power-off" state of the message uttering device 107 is only required to be a state in which the electric power from the battery 40 is not used. For example, the "power-off" state of the message uttering device 107 may be a "state in which a voltage is applied to lines (conducting lines) for supplying the electric power from the battery 40 to the message uttering device 107, but the message uttering device 107 does not consume the electric power."

Further, the message generation conditions for causing the message uttering device 107 to utter the message are not limited to the above-mentioned two conditions. Other conditions may be set in advance in addition to the two conditions, or conditions different from the two conditions may be set in advance.

Still further, as the warning device, description has been given of the meter 104 including the buzzer 105 capable of generating the sound and the multi-information display (MID) 106 capable of displaying the image, but the warning device is not limited to the meter 104. The warning device is only required to have a configuration in which the warning directed to the occupant of the own vehicle can be generated through use of at least one of the sound or the light in the power-on state in which the electric power from the battery is used.

Yet further, description has been given of the right BSM ECU 101R as the control device configured to switch the message uttering device 107 to the power-off state, but the control device is not limited to the right BSM ECU 101R. Moreover, the message uttering device 107 may include a circuit configured to switch between the ON state and the OFF state of the own power supply, and the circuit may be configured to switch the power supply for the message uttering device 107 itself from the ON state to the OFF state when the operation mode of the vehicle exit assist control is switched from the first mode to the second mode.

What is claimed is:

1. A vehicle exit assist apparatus, comprising:
   a warning device configured to generate a warning directed to an occupant of an own vehicle through use of at least one of sound or light in a power-on state in which electric power from a battery configured to be charged through electric power generated by a generator in operation is used;
   a message uttering device configured to utter a sound message, which is different from the warning, in the power-on state in which the electric power from the battery is used; and
   a control device configured to determine whether there exists an alert-target moving object, which approaches the own vehicle during a period in which the own vehicle is stopped, and is a target of alert when the occupant exits the own vehicle, in the power-on state in which the electric power from the battery is used, cause the warning device to generate the warning when the control device determines that the alert-target moving object exists, and to cause the message uttering device to utter the sound message when the control device determines that a predetermined message generation condition is satisfied, wherein, when the generator is stopped in the power-on state, and a predetermined specific condition for inhibiting the message uttering device from uttering the sound message is satisfied, the control device changes a state of the message uttering device from the power-on state to a power-off state in which electric power from the battery is inhibited from being used, under a state in which the control device is maintained in the power-on state, and wherein the control device is configured to determine that the predetermined specific condition is satisfied when at least one condition of a first condition, a second condition, and a third condition is satisfied, the first condition being satisfied when a boarding door provided for the own vehicle is continuously in an open state for a first period, the second condition being satisfied when a luggage door provided for the own vehicle is in an open state, the third condition being satisfied when an operation for switching door lock devices provided for the own vehicle to a locked state is performed from an outside of the own vehicle.

2. The vehicle exit assist apparatus according to claim 1, wherein the control device is configured to determine that the predetermined specific condition is satisfied also when a fourth condition is satisfied, the fourth condition being satisfied when a duration in which the generator is stopped has become equal to or longer than a second period.

3. The vehicle exit assist apparatus according to claim 1, wherein the control device is configured to:

restrict opening of a vehicle door of the own vehicle when the control device determines that the alert-target moving object exists during the period in which the own vehicle is stopped; and determine, when the control device detects an operation for opening the vehicle door under a state in which the opening of the vehicle door is restricted, that the message generation condition is satisfied, and cause the message uttering device to utter a sound message indicating that the opening of the vehicle door is restricted.

* * * * *